US 6,686,430 B1

(12) United States Patent
Nagamune

(10) Patent No.: US 6,686,430 B1
(45) Date of Patent: Feb. 3, 2004

(54) ALICYCLIC HYDROCARBON COPOLYMER

(75) Inventor: Tsutomu Nagamune, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/048,493

(22) PCT Filed: Aug. 11, 2000

(86) PCT No.: PCT/JP00/05390
§ 371 (c)(1),
(2), (4) Date: Feb. 12, 2002

(87) PCT Pub. No.: WO01/12680
PCT Pub. Date: Feb. 22, 2001

(30) Foreign Application Priority Data

Aug. 12, 1999 (JP) .......................................... 11-228384

(51) Int. Cl.[7] .................................................. C08F 8/04
(52) U.S. Cl. ........................... 526/309; 526/79; 526/87; 526/262; 526/279; 526/308; 525/326.5; 525/333.3; 525/338
(58) Field of Search ................................ 526/279, 308, 526/309, 79, 87, 262; 525/326.5, 333.3, 338

(56) References Cited

U.S. PATENT DOCUMENTS 3,383,348 A * 5/1968 Grasley ...................... 526/308
4,600,749 A * 7/1986 Minekawa et al. ......... 525/314
6,218,485 B1 * 4/2001 Muramoto et al. ........... 526/87

FOREIGN PATENT DOCUMENTS

| JP | 1-317728 | 12/1989 |
| JP | 1-318015 | 12/1989 |
| JP | 8-301928 | 11/1996 |

* cited by examiner

*Primary Examiner*—Fred Teskin
(74) *Attorney, Agent, or Firm*—Armstrong, Kratz, Quintos, Hanson & Brooks, LLP

(57) ABSTRACT

A novel alicyclic hydrocarbon copolymer having a weight average molecular weight (Mw) of 1,000–1,000,000 a comprising repeating units (a) having an alicyclic structure and repeating units (b) having a chainlike structure; the sum of repeating units (a) and repeating units (b) being at least 90 wt. % based on the copolymer, and the content of repeating units (b) being at least 1 wt. % but smaller than 10 wt. %, based on the copolymer; and the chain of repeating units (a) satisfying the formula: $A \leq 0.3 \times B$ where A=weight average molecular weight of the chain of repeating units (a), and B=Mw of the copolymer×(number of repeating units (a)/number of the total repeating units constituting the copolymer). The copolymer exhibits low birefringence and high mechanical strength. A process for producing the copolymer is provided.

16 Claims, No Drawings

ALICYCLIC HYDROCARBON COPOLYMER

TECHNICAL FIELD

This invention relates to a novel alicyclic hydrocarbon copolymer exhibiting low birefringence and excellent mechanical strength, a process for producing the alicyclic hydrocarbon copolymer, and a resin composition comprising the alicyclic hydrocarbon copolymer.

BACKGROUND ART

A hydrogenated aromatic vinyl polymer prepared by hydrogenating aromatic rings of an aromatic vinyl polymer such as polystyrene, and a hydrogenated aromatic vinyl copolymer prepared by hydrogenating a copolymer of an aromatic vinyl compound with a vinyl compound are known as an optical material exhibiting low birefringence.

For example, it is described in Japanese Unexamined Patent Publication No. H1-317728 that an optical disk substrate having low birefringence is made from a hydrogennated polystyrene resin or a hydrogenated styrene-butadiene-styrene block copolymer.

In recent years, these hydrogenated aromatic vinyl polymers have been proposed for use in a pick-up lens for reading signal of an optical disk as well as in an optical disk substrate, because these hydrogenated aromatic vinyl polymers exhibit high transparency, high heat resistance and low water absorption. Nevertheless, a far reduced birefringence is required for a pick-up lens for reading signal of an optical disk having a high recording density such as an optical disk for the following generation. But, the pick-up lens for reading signal of an optical disk having a high recording density has a complicated shape and thus the birefringence tends to be undesirably high.

In general, the birefringence of optical parts varies depending upon the birefringence inherently possessed by a material used and the residual stress at shaping. It is impossible to reduce the birefringence inherently possessed by a material used, and therefore, it is required to reduce the residual stress by enhancing fluidity of a resin material, for example, by employing a resin material having a low molecular weight or elevating a resin-shaping temperature. However, the resin material having a low molecular weight gives a shaped article having poor mechanical strength and the birefringence cannot be reduced to the extent desired for optical disks for the following generation.

In international publication WO96/28660, a catalyst is described which exhibits an activity for hydrogenating the backbone chain and aromatic rings in a copolymer such as a random copolymer or tapered block copolymer of an aromatic vinyl compound with a chainlike vinyl compound. A specific working example using the catalyst is described wherein a copolymer containing at least 90% by weight of butadiene units is hydrogenated. However, the resulting copolymer does not exhibits a sufficiently low birefringence, and has low glass transition temperature and poor mechanical strength, and thus, is of no practical use as optical material.

DISCLOSURE OF THE INVENTION

In view of the foregoing, a primary object of the present invention is to provide a novel alicyclic hydrocarbon polymer having low birefringence and enhanced mechanical strength, and a process for producing the novel alicyclic hydrocarbon polymer.

Thus, in accordance with the present invention, there is provided an alicyclic hydrocarbon copolymer having a weight average molecular weight in the range of 1,000 to 1,000,000 and comprising repeating units (a) represented by the following general formula (1), and at least one kind of repeating units (b) selected from those which are represented by the following general formula (2) and/or the following general formula (3); the sum of repeating units (a) and repeating units (b) being at least 90% by weight based on the weight of the copolymer, and the content of repeating units (b) being at least 1% by weight but smaller than 10% by weight, based on the weight of the copolymer; and the chain of repeating units (a) satisfying the following formula:

$$A \leq 0.3 \times B$$

where A=weight average molecular weight of the chain of repeating units (a), and B=weight average molecular weight (Mw) of the alicyclic hydrocarbon copolymer×(number of repeating units (a)/number of the total repeating units constituting the alicyclic hydrocarbon copolymer),

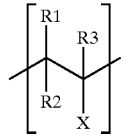

Formula (1)

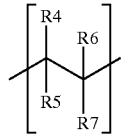

Formula (2)

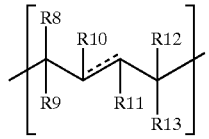

Formula (3)

wherein X in formula (1) is an alicyclic hydrocarbon group, R1 through R13 in formulae (1), (2) and (3) independently represent a hydrogen atom, a chainlike hydrocarbon group, a halogen atom, an alkoxy group, a hydroxy group, an ether group, an ester group, a cyano group, an amide group, an imide group, a silyl group, and a chainlike hydrocarbon group having one or more polar groups as a substituent which are selected from a halogen atom, an alkoxy group, a hydroxy group, an ether group, an ester group, a cyano group, an amide group, an imide group and a silyl group; and ═══ in formula (3) represents a carbon-carbon saturated or unsaturated bond.

The chain of repeating units (a) represented by formula (1) preferably satisfies the following formula:

$$A/C \geq 1.3$$

where A=weight average molecular weight of the chain of repeating units (a), and C=number average molecular weight of the chain of repeating units (a).

In accordance with the present invention, there is further provided a process for producing an alicyclic hydrocarbon copolymer comprising:

a step of copolymerizing an aromatic vinyl compound and/or an alicyclic vinyl compound (a') with other copolymerizable monomer (b') to obtain a hydrocarbon copolymer satisfying the following formula:

$$D \leq 0.3 \times E$$

where D=weight average molecular weight of the chain of repeating units derived from the aromatic vinyl compound and/or the alicyclic vinyl compound, and E=weight average molecular weight (Mw) of the alicyclic hydrocarbon copolymer×(number of repeating units derived from the aromatic vinyl compound and/or the alicyclic vinyl compound/number of the total repeating units constituting the alicyclic hydrocarbon copolymer); and a step of hydrogenating carbon-carbon unsaturated bonds in the unsaturated rings and the backbone chain of the alicyclic hydrocarbon copolymer.

BEST MODE FOR CARRYING OUT THE INVENTION

1. Alicyclic Hydrocarbon Copolymer

The alicyclic hydrocarbon copolymer of the present invention is characterized as comprising repeating units (a) represented by the following general formula (1) and repeating units (b) represented by the following general formula (2) and/or the following general formula (3), and, if desired, other repeating units (c).

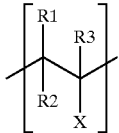

Formula (1)

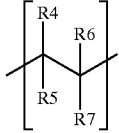

Formula (2)

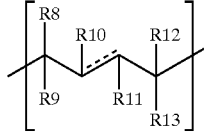

Formula (3)

wherein R1 through R13 in formulae (1), (2) and (3) independently represent a hydrogen atom, a chainlike hydrocarbon group, a halogen atom, an alkoxy group, a hydroxy group, an ether group, an ester group, a cyano group, an amide group, an imide group, a silyl group, and a chainlike hydrocarbon group having one or more polar groups as a substituent which are selected from a halogen atom, an alkoxy group, a hydroxy group, an ether group, an ester group, a cyano group, an amide group, an imide group and a silyl group. Of these, a hydrogen atom and a chainlike hydrocarbon group having 1 to 6 carbon atoms are preferable in view of enhanced heat resistance and reduced water absorption. The halogen atom includes a fluorine atom, a chlorine atom, a bromine atom and a iodine atom. The chainlike hydrocarbon group having a polar group as a substituent includes, for example, a halogenated alkyl group having 1 to 20 carbon atoms, preferably 1 to 10 carbon atoms and more preferably 1 to 6 carbon atoms. The chainlike hydrocarbon group includes, for example, an alkyl group having 1 to 20 carbon atoms, preferably 1 to 10 carbon atoms and more preferably 1 to 6 carbon atoms, and an alkenyl group having 2 to 20 carbon atoms, preferably 2 to 10 carbon atoms and more preferably 2 to 6 carbon atoms.

X in formula (1) is an alicyclic hydrocarbon group. The number of carbon atoms in X is usually in the range of 4 to 20, preferably 4 to 10 and more preferably 5 to 7. When the number of carbon atoms in the alicyclic hydrocarbon group is in this range, the birefringence can be reduced to a considerable extent. The alicyclic structure may be either a monocyclic structure or a polycyclic structure such as a norbornane ring or a dicyclohexane ring.

The alicyclic hydrocarbon group may contain a carbon-carbon unsaturated bond, but the content thereof is usually not larger than 10%, preferably not larger than 5% and more preferably not larger than 3%, based on the total carbon-carbon bonds. When the content of carbon-carbon unsaturated bond is in this range, transparency and heat resistance are enhanced.

The carbon atoms constituting the alicyclic hydrocarbon group may have a member bound thereto, which includes, for example, a hydrogen atom, a hydrocarbon group, a halogen atom, an alkoxy group, a hydroxy group, an ether group, an ester group, a cyano group, an amide group, an imide group, a silyl group, and a chainlike hydrocarbon group having a polar group as a substituent which is selected from a halogen atom, an alkoxy group, a hydroxy group, an ether group, an ester group, a cyano group, an amide group, an imide group and a silyl group. Of these members, a hydrogen atom and a chainlike hydrocarbon group having 1 to 6 carbon atoms are preferable in view of heat resistance and low water absorption.

═══ in formula (3) represents a carbon-carbon saturated bond or carbon-carbon unsaturated bond. When high transparency and high heat resistance are strongly desired, the content of carbon-carbon unsaturated bond is usually not larger than 10%, preferably not larger than 5% and more preferably not larger than 3%, based on the total carbon-carbon bonds constituting the backbone chain.

Among the repeating units (a) represented by formula (1), repeating units represented by the following general formula (4) are preferable in view of enhanced heat resistance and low water absorption.

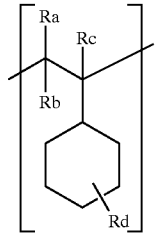

Formula (4)

Among the repeating units represented by formula (2), repeating units represented by the following general formula (5) are preferable in view of enhanced heat resistance and low water absorption.

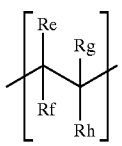

Formula (5)

Among the repeating units represented by formula (3), repeating units represented by the following general formula (6) are preferable in view of enhanced heat resistance and low water absorption.

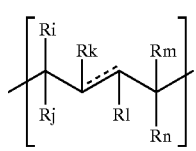

Formula (6)

Ra, Rb, Rc, Rd, Re, Rf, Rg, Rh, Ri, Rj, Rk, Rl, Rm and Rn in formulae (4), (5) and (6) independently represent a hydrogen atom or a lower chainlike hydrocarbon group. In view of enhanced heat resistance and low water absorption, a hydrogen atom and a lower alkyl group having 1 to 6 carbon atoms are preferable.

Among the repeating units represented by formulae (2) and (3), those which are represented by formula (3) are preferable in view of high mechanical strength of the hydrocarbon copolymer.

In the alicyclic hydrocarbon copolymer of the present invention, the sum of repeating units (a) of formula (1) and repeating units (b) of formula (2) and/or formula (3) is at least 90% by weight, preferably at least 95% by weight and more preferably at least 97% by weight, based on the weight of the copolymer. When this requirement is satisfied, low birefringence, heat resistance, low water absorption and mechanical strength are well balanced.

The content of the repeating units (b) in the alicyclic hydrocarbon copolymer varies depending upon the use of the copolymer, but is usually at least 1% by weight but smaller than 10% by weight, preferably 1% to 8% by weight and more preferably at least 2% to 6% by weight, based on the weight of the copolymer. When the content of repeating units (b) is in this range, low birefringence, heat resistance and low water absorption are well balanced.

The chain length of repeating units (a) is preferably as short as possible, more specifically, satisfies the following formula:

$A \leq 0.3 \times B$ where A=weight average molecular weight of the chain of repeating units (a), and B=weight average molecular weight (Mw) of the alicyclic hydrocarbon copolymer×(number of repeating units (a)/number of the total repeating units constituting the alicyclic hydrocarbon copolymer). Preferably, A is not larger than 20% of B, more preferably not larger than 15% of B and especially preferably not larger than 10of B. When A is not larger than 30% of B, the birefringence can be more reduced.

Further, the chain length of repeating units (a) preferably has a specific distribution. More specifically the following formula is preferably satisfied.

$A/C \geq 1.3$ where A=weight average molecular weight of the chain of repeating units (a), and C=number average molecular weight of the chain of repeating units (a). More preferably the ratio A/C is in the range of 1.3 to 8, and especially preferably in the range of 1.7 to 6. If the ratio A/C is too small, the degree of blocking tends to become high. In contrast, if the ratio A/C is too large, the degree of randomness tends to become high. In both cases, birefringence tends to become larger.

The molecular weight of the alicyclic hydrocarbon copolymer of the present invention is in the range of 1,000 to 1.000,000, preferably 5,000 to 500,000, more preferably 10,000 to 300,000 and most preferably 50,000 to 250,000, as weight average molecular weight (Mw) measured by gel permeation chromatography (GPC) and expressed in terms of polystyrene or polyisoprene. If the weight average molecular weight (Mw) of the alicyclic hydrocarbon copolymer is too small, the mechanical strength of shaped article is poor. In contrast, if the Mw is too large, the birefringence of shaped article becomes large.

The distribution of molecular weight of the alicyclic hydrocarbon copolymer can be varied depending upon the use thereof, but, the ratio (Mw/Mn) of the weight average molecular weight (Mw) to the number average molecular weight (Mn), which are measured by GPC and expressed in terms of polystyrene or polyisoprene, is usually not larger than 2.5, preferably not larger than 2.3 and more preferably not larger than 2. When the ratio (Mw/Mn) s in this range, the mechanical strength and heat resistance are well balanced.

The glass transition temperature (Tg) of the alicyclic hydrocarbon copolymer varies depending upon the use thereof but is usually in the range of 50° to 250° C., preferably 70° C. to 200° C. and more preferably 90° C. to 180° C.

2. Process for Producing Alicyclic Hydrocarbon Copolymer

The alicyclic hydrocarbon copolymer of the present invention is produced, for example, by (1) a process which comprises a step of copolymerizing an aromatic vinyl compound with other copolymerizable monomer to obtain a hydrocarbon copolymer, and then hydrogenating carbon-carbon unsaturated bonds in aromatic rings of the copolymer, or (2) a process which comprises a step of copolymerizing an alicyclic vinyl compound with other copolymerizable monomer to obtain a hydrocarbon copolymer, and then, if carbon-carbon double bonds are present in the backbone chain and the aliphatic rings in the copolymer, hydrogenating the carbon-carbon unsaturated bonds. Of these, process of (1) is preferable because the alicyclic hydrocarbon copolymer can be more efficiently produced.

The alicyclic hydrocarbon copolymer of the present invention can be produced with a high efficiency by a process which comprises a step of copolymerizing an aromatic vinyl compound and/or an alicyclic vinyl compound (a') with other copolymerizable monomer (b') to obtain a hydrocarbon copolymer satisfying the following formula:

$D \leq 0.3 \times E$ where D=weight average molecular weight of the chain of repeating units derived from the aromatic vinyl compound and/or the alicyclic vinyl compound, and E=weight average molecular weight (Mw) of the alicyclic hydrocarbon copolymer×(number of repeating units derived from the aromatic vinyl compound and/or the alicyclic vinyl compound/number of the total repeating units constituting the alicyclic hydrocarbon copolymer); and a step of hydrogenating carbon-carbon unsaturated bonds in unsaturated rings (such as aromatic rings and cycloalkene rings) and the backbone chain of the alicyclic hydrocarbon copolymer.

D is preferably not larger than 20% of E, more preferably not larger than 15% of E and most preferably not larger than 10% of E. When the alicyclic hydrocarbon copolymer has a chain structure satisfying the above formula $D \leq 0.3 \times E$, the copolymer exhibits sufficiently low birefringence.

The alicyclic hydrocarbon copolymer before hydrogenation preferably has a ratio D/F falling within a predetermined range, wherein D is as fined above, and F is number average molecular weight of the chain of repeating units derived from the aromatic vinyl compound and/or the alicyclic vinyl compound. More specifically the ratio D/F is preferably at least 1.3, more preferably 1.3 to 8, and most preferably 1.7 to 6. When the ratio D/F is within this range, the birefringence of the alicyclic hydrocarbon copolymer can be reduced to a greater extent.

The weight average molecular weight and number average molecular weight of the chain of repeating units derived from the above-mentioned compound (a') can be determined, for example, by a method described in Macromolecules, 1983, No. 16, p1925–1928 wherein unsaturated bonds of an aromatic vinyl copolymer are ozonated and then subjected to reductive cleavage, and then the molecular weight of the aromatic vinyl chain taken is measured.

The molecular weight of the alicyclic hydrocarbon copolymer before hydrogenation is in the range of 1,000 to 1,000,000, preferably 5,000 to 500,000 and more preferably 10,000 to 300,000, as weight average molecular weight (Mw) measured by gel permeation chromatography (GPC) and expressed in terms of polystyrene or polyisoprene. If the weight average molecular weight (Mw) of the alicyclic hydrocarbon copolymer is too small, the mechanical strength of shaped article is poor. In contrast, if the Mw is too large, the reactivity for hydrogenation is poor.

As specific examples of the aromatic vinyl compound used in the above-mentioned process of (1), there can be mentioned styrene, α-methylstyrene, α-ethylstyrene, α-propylstyrene, α-isopropylstyrene, α-t-butylstyrene, 2-methylstyrene, 3-methylstyrene, 4-methylstyrene, 2,4-disopropylstyrene, 2,4-dimethylstyrene, 4-t-butylstyrene, 5-t-butyl-2-methylstyrene, monochlorostyrene, dichlorostyrene, monofluorostyrene and 4-phenylstyrene. Of these, styrene, 2-methylstyrene, 3-methylstyrene and 4-methylstyrene are preferable.

As specific examples of the alicyclic vinyl compound used in the above-mentioned process of (2), there can be mentioned cyclobutylethylene, cyclopentylethylene, cyclohexylethylene, cycloheptylethylene, cyclooctylethylene, norbornylethylene, dioyclohexylethylene, α-methylcyclohexylethylene, α-t-butylcyclohexylethylene, cyclopentenylethylene, cyclohexylethylene, cycloheptenylethylene, cyclooctenylethylene, cyclodecenylethylene, norbornenylethylene, α-methylcyclohexenylethylene and α-t-butylcyclohexenylethylene, Of these, cyclohexylethylene and α-methylcyclohexylethylene are preferable.

These aromatic vinyl compounds and alicyclic vinyl compounds may be used either alone or as a combination of at least two thereof.

The other copolymerizable monomer is not particularly limited, but includes chainlike vinyl compounds and chainlike conjugated diene compounds. Especially chainlike conjugated diene compounds are beneficial because their handling in the production process is easy and the resulting copolymer has high mechanical strength.

As specific examples of the chainlike vinyl compounds, there can be mentioned chainlike olefin monomers such as ethylene, propylene, 1-butene, 1-pentene and 4-methyl-1-pentene; nitrile monomers such as 1-cyanoethylene (i.e., acrylonitrile), 1-cyano-1-methylethylene (i.e., methacrylonitrile) and 1-cyano-1-chloroethylene (i.e., α-chloroacrylonitrile); and methacrylic acid esters and acrylic acid esters, such as 1-(methoxycarbonyl)-1-methylethylene (i.e., methyl methacrylate), 1-(ethoxycarbonyl)-1-methylethylene (i.e., ethyl mathacrylate), 1-(propoxycarbonyl)-1-methylethylene (i.e., propyl methacrylate), 1-(butoxycarbonyl)-1-methylethylene (i.e., butyl methacrylate), 1-methoxycarbonylethylene (i.e., methyl acrylate), 1-ethoxycarbonylethylene (i.e., ethyl acrylate), 1-propoxycarbonylethylene (i.e., propyl acrylate) and 1-butoxycarbonylethylene (i.e., butyl acrylate); and unsaturated fatty acid monomers and their anhydrides such as 1-carboxyethylene (i,e., acrylic acid), 1-carboxy-1-methlethylene (i.e., acrylic acid), 1-carboxy-1-methylethylene (i.e., methacrylic acid) and maleic anhydride. Of these, chainlika olefin monomers are preferable. Ethylene, propylene and 1-butene are especially preferable.

As specific examples of the chainlike conjugated diene compounds, there can be mentioned 1,3-butadiene, isoprene, 2,3-dimethyl-1,3-butadiene, 1,3-pentadiene and 1,3-hexadiene. Among the chainlike vinyl compounds and the chainlike conjugated diene compounds, the chainlike conjugated diene compounds are preferable. Butadiene and isoprene are especially preferable. These chainlike vinyl compounds and chainlike conjugated diene compounds may be used either alone or as a combination of at least two thereof.

The procedure for polymerizing the compound (a') is not particularly limited. One lot polymerization procedure (i.e. batchwise procedure) and monomer-sequentially-adding polymerization procedure (i.e., a procedure in which polymerization is initiated with a part of the total amount of monomers, and then, the remaining monomers are sequentially added with a progress of polymerization) can be mentioned. Especially the monomer-sequentially-adding polymerization procedure is preferable because a hydrocarbon copolymer having a desired chain structure is obtained.

When the above-mentioned D value is smaller and/or the above-mentioned D/F value is larger, the copolymer before hydrogenation exhibits a more random chain structure. Randomness of the copolymer varies depending upon the ratio of polymerization rate of an aromatic vinyl compound to polymerization rate of other copolymerizable monomer. When this ratio of polymerization rate is smaller, the copolymer has a more random chain structure.

According to the monomer-sequentially-adding polymerization procedure, as a uniform monomer mixture is sequentially added to a polymerization system, polymerization selectivity of monomer during the course of growth of polymer is minimized and thus the resulting copolymer has a more random chain structure. Further, accumulation of heat of polymerization in a polymerization system can be reduced and thus the polymerization temperature can be kept low and stable. This is in striking contrast to the batchwise polymerization procedure.

When monomers are sequentially added to a polymerization system, it is beneficial that polymerization is initiated with initial monomers present In a reactor in an amount of usually 0.01% to 60% by weight, preferably 0.02% to 20% by weight and more preferably 0.05% to 10% by weight based on the total weight of monomers. When this amount of initial monomers is present in a reactor, the heat of polymerization generated in the initial stage of polymerization can easily be removed and a copolymer having a highly random chain structure can be obtained.

When the polymerization is allowed to proceed until the conversion of the above-mentioned initial monomers reaches at least 70%, preferably at least 80% and more preferably at least 90%, randomness of the chain structure of copolymer is more enhanced. Thereafter, the remainder of monomers is continually added to the polymerization system with a progress of polymerization. The rate of addition of monomers is appropriately determined depending upon the rate of consumption of monomers in the polymerization system, The time for which the remainder of monomers is continually added to the polymerization system is usually in the range of 0.5 to 3 times, preferably 0.8 to 2 times and more preferably 1 to 1.5 times of "t" as defined by the following equation:

$$t=[(100-I) \times T/I]$$

where T is a time for which the conversion of initial monomers reaches 90%, and I is a ratio (%) of the amount of initial monomers to the total amount of monomers. More specifically the remainder of monomers is added over a period in the range of usually 0.1 to 30 hours, preferably 0.5 to 5 hours and more preferably 1 to 3 hours. The conversion of monomers as observed immediately after the completion of addition of the remainder of monomers is usually at least 60%, preferably at least 85% and more preferably at least 90%. When this conversion of monomers is at least 80%, a very high randomness of the chain structure of copolymer can be obtained.

Any method of radical polymerization, anion polymerization and cation polymerization can be employed. However, anion polymerization method is preferable in view of ease in an operation for polymerization and hydrogenation reaction, and the mechanical strength of hydrocarbon copolymer.

In the case of radical polymerization, a procedure of bulk polymerization, solution polymerization, suspension polymerization or emulsion polymerization can be carried out in the presence of an initiator at a temperature of usually in the range from 0° C. to 200° C., preferably from 20° C. to 150° C. If it is strongly desired to avoid incorporation of impurities in copolymer, bulk polymerization and suspension polymerization are preferable. As specific examples of the initiator, there can be mentioned organic peroxides such as benzoyl peroxide, lauroyl peroxide and t-butyl-peroxy-2-ethylhexanoate; azo compounds such as azoisobutyronlitrile, 4,4-azobis-4-cyanopentanoic acid and azodibenzoyl, water-soluble catalysts and redox catalysts which include potassium persulfate or amonium persulfate.

In the case of anion polymerization, a procedure of bulk polymerization, solution polymerization or slurry polymerization can be carried out in the presence of an initiator at a temperature of usually in the range from 0° C. to 200° C., preferably from 20° C. to 100° C. and especially preferably from 20° C. to 80° C. Solution polymerization is preferable in view of removal of heat of polymerization. In solution polymerization, an inert solvent capable of dissolving a copolymer before hydrogenation and a hydrogenated copolymer is usually used.

As specific examples of the solvent used in solution polymerization, there can be mentioned aliphatic hydrocarbons such as n-butane, n-pentane, iso-pentane, n-hexane, n-heptane and iso-octane; alicyclic hydrocarbons such as cyclopentans, cyclohexane, methylcyclopentane, methylcyclohexane and decalin; and aromatic hydrocarbons such as benzene and toluene. When an aliphatic hydrocarbon or an alicyclic hydrocarbon is used for solution polymerization, the hydrogenation of copolymer can be carried out in the same inert solvent as it is, These solvents may be used either alone or as a combination of at least two thereof. The amount of solvent is usually in the range of 200 to 10,000 parts by weight based on 100 parts by weight of the total monomers.

As specific examples of the initiator used for the above-mentioned anion polymerization, there can be mentioned mono-organolithium initiators such as n-butyllithium, sec-butyllithium, t-butyllithium, hexyllithium and phenyllithium, and polyfunctional organolithium initiators such as dilithiomethane, 1,4-diobutane and 1,4-dilithio-2-ethylcyclohexane.

In the polymerization reaction, a polymerization accelerator or randomizer (i.e., an auxiliary having a function of preventing the growth of the chain of certain specific monomeric units) can be used. In the case of anion polymerization, a Lewis base compound can be used as an example of the randomizer. As specific examples of the Lewis base compound, there can be mentioned ether compounds such as dimethyl ether, diethyl ether, diisopropyl ether, dibutyl ether, tetrahydrofuran, diphenyl ether, ethylene glycol diethyl ether and ethylene glycol methyl phenyl ether; tertiary amine compounds such as tetramethylethylenediamine, trimethylamins, triethylamine and pyridine; alkali metal alkoxides such as potassium t-amyloxide and potassium t-butyloxide; and phosphine compounds such as triphenylphosphine. These Lewis base compounds may be used either alone or as a combination of at least two thereof.

The copolymer made by, for example, radical polymerization or anion polymerization can be recovered by a known method such as a steam stripping method, a direct desolvation method or an alcohol-coagulating method. When the polymerization is carried out in a solvent which is inert to the hydrogenation reaction, the polymerization liquid containing a copolymer can be subjected to hydrogenation as it is without recovery of copolymer from the polymerization liquid.

(Step of Hydrogenation of Unsaturated Bonds)

The hydrogenation of carbon-carbon unsaturated bonds in unsaturated rings such as an aromatic ring or a cycloalkene ring, or unsaturated bonds in the backbone chain can be carried out by a known method. The method and reaction fashion of hydrogenation are not particularly limited. However, a method is preferably employed by which a high degree of hydrogenation can be obtained with minimized cleavage of polymer chain occurring simultaneously with the hydrogenation. The preferable method includes, for example, a hydrogenation method using a catalyst containing at least one metal selected from nickel, cobalt, iron, titanium, rhodium, palladium, platinum, ruthenium and rhenium in an organic solvent.

The hydrogenation catalyst may be either a heterogeneous catalyst or a homogeneous catalyst.

The heterogeneous catalyst comprised of metal or a metal compound may be used either as it is, or in a form supported on an appropriate carrier. The carrier used includes, for example, active carbon, silica, alumina, calcium carbide, titania, magnesia, zirconia, diatomaceous earth and silicon carbide. The amount of catalyst supported on the carrier is usually in the range of 0.01% to 80% by weight and preferably 0.05% to 60% by weight.

The homogeneous catalyst includes, for example, a combination of nickel, cobalt, titanium or iron compound with an organometal compound (for example, an organoaluminum compound or an organolithium compound), and organometal complex catalysts containing, for example, rhodium, palladium, platinum, ruthenium or rhenium. As specific examples of the nickel, cobalt, titanium or iron compound, there can be mentioned acetylacetone salts, naphthene salts, cyclopentadienyl compounds and cyclopentadienyl-dichloro compounds of nickel, cobalt, titanium or iron. As specific examples of the organoaluminum compound, there can be mentioned alkylaluminum compounds such as triethylaluminum and triisobutylaluminum; alkylaluinum halides such as diethyaluminum chloride and ethylalumlnum dichloride; and alkylaluminum hydride such as diisobutylaluminum hydride.

As specific examples of the organometal complex catalysts, there can be mentioned γ-dichloro-π-benzene complex, dichloro-tris (triphenylphosphine) complex and other complexes, which contain the above-recited metals.

These hydrogenation catalysts may be used either alone or as a combination of at least two thereof. The amount of hydrogenation catalyst is usually in the range of 0.01 to 100 parts by weight, preferably 0.05 to 50 parts by weight and more preferably 0.1 to 30 parts by weight, based on 100 parts by weight of polymer.

The hydrogenation reaction is carried out usually at a temperature in the range of 10° C. to 250° C. In view of enhanced hydrogenation percentage and minimization of polymer chain cleavage occurring simultaneously with hydrogenation reaction, the hydrogenation temperature is preferably in the range of 50° C. to 200° C., and more preferably 80° C. to 180° C. The hydrogen pressure is usually in the range of 0.1 MPa to 30 MPa. In view of the above-mentioned reasons and operability, the hydrogen pressure is preferably in the range of 1 MPa to 20 MPa and more preferably 2 MPa to 10 MPa.

The hydrogenation percentages obtained, which are measured by $^1$H-NMR and based on carbon-carbon unsaturated bonds in the backbone chain, carbon-carbon double bonds in the aromatia rings and carbon-carbon unsaturated bonds in the unsaturated rings, are usually at least 90%, preferably at least 95% and more preferably at least 97%. When the hydrogenation percentage is low, the copolymer tends to have relatively high birefringence and poor heat stability.

The method of recovering a hydrogenated copolymer after completion of hydrogenation is not particularly limited, and, as specific examples thereof, there can be mentioned a method of removing the residue of hydrogenation catalyst by, for example, filtration or centrifugal separation, and then removing a solvent directly from the solution of hydrogenated copolymer by drying, and a method of pouring the solution of hydrogenated copolymer into a poor solvent for the hydrogenated copolymer to thereby coagulate the copolymer.

3. Resin Composition

In one aspect of the present invention, there is provided a resin composition comprising the above-mentioned alicyclic hydrocarbon copolymer and an antioxidant.

The antioxidant includes, for example, phenolic antioxidants, phosphorus type antioxidants and sulfur type antioxidants. Of these, phenolic type antioxidants are preferable. Alkyl-substituted phenolic type antioxidants are especially preferable. By incorporation of these antioxidants, coloration of copolymer and reduction of mechanical strength of copolymer occurring due to oxidative deterioration upon shaping of copolymer can be prevented or minimized without reduction of transparency nor influence on low birefringence.

As specific examples of the phenolic antioxidants, there can be mentioned acrylate compounds described in Japanese Unexamined Patent Publication (JP-A) No. S63-179553 and JP-A H1-168423, such as 2-t-butyl-6-(3-t-butyl-2-hydroxy-5-methylbenzyl)-4-methylpehenyl acrylate, 2,4-t-amyl-6-(1-(3,5-di-t-anyl-2-hydroxyphenyl)ethyl)phenyl acrylate; alkyl-substituted phenolic compounds such as octadecyl-3-(3,5-di-t-butyl-4-hydroxyphenyl)propionate, 2,2'-methylene-bis(4-methyl-6-t-butylphenol), 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3',5'-di-t-butyl-4'-hydroxyphenyl)propionate)methane [i.e., pentaerythrimethyl-tetrakis(3-(3,5-di-t-butyl-4-hydroxyphenylpropionate] and triethyleneglycol bis(3-(3-t-butyl-4-hydroxy-5-methylphenyl)propionate); and triazine compounds such as 6-(4-hydroxy-3,5-di-t-butylanilino)-2,4-bis-octylthio-1,3,5-triazine, 6-(4-hydroxy-3,5-dimetylanilino)-2,4-bis-octylthio-1,3,5-triazine and 2-octylthio-4,6-bis(3,5-di-t-butyl-4-oxyanilino)-1,3,5-triazine.

As specific examples of the phosphorus type antioxidants, there can be mentioned monophosphite compounds such as triphenyl phosphite, diphenylisodecyl phosphite, phenyldiisodecyl phosphite, tris(nonylphenyl)phosphite, tris(dinonylphenyl)phosphite, tris(2,4-di-t-butylphenyl) phosphite and 10-(3,5-di-t-butyl-4-hydroxybenzyl)-9,10-dihydro-9-oxa-10-phosphaphananthrene-10-oxide; and diphosphite compounds such as 4,4'-butylidene-bis(3-methyl-6-t-butylphenyl-di-tridecylphosphit) and 4,4'-isopropylidene-bis(phenyl-di-alkyl($C_{12}$–$C_{15}$)phosphite). Of these, monophosphite compounds are preferable. Tris(nonylphenyl)phosphite, tris(dinonylphenyl)phosphite and tris(2,4-di-t-butylphenyl)phosphite are especially preferable.

As specific examples of the sulfur type antioxidant, there can be mentioned dilauryl 3,3'-thiodipropionate, dimyristyl 3,3'-thiodipropionate, distearyl 3,3'-thiodipropionate, laurylstearyl 3,3-thiodipropionate, pentaerythritol-tetrakis-(β-lauryl-thio-propionate), and 3,9-bis(2-dodecylthioethyl)-2,4,8,10-tetraoxaspito[5,5]undecane.

These antioxidants may be used either alone or as a combination of at least two thereof. The amount of antioxidant is appropriately chosen provided that the object of the present invention can be achieved. Usually the amount of antioxidant is in the range of 0.001 to 5 parts by weight and preferably 0.01 to 1 part by weight based on 100 parts by weight of the alicyclic hydrocarbon copolymer.

The present invention provides a resin composition comprising the above-mentioned alicyclic hydrocarbon copolymer, and at least one ingredient selected from the group consisting of (1) soft polymers, (2) alcoholic compounds, and (3) organic or inorganic fillers. This resin composition is characterized in that it is not whitened when maintained under high-temperature and high-humidity conditions for a long period of time, with the properties such as transparency, low birefringence and mechanical strength remaining a good state. Among these ingredients, soft polymers and alcoholic compounds have an excellent function of preventing whitening, and maintaining high transparency when the resin composition is stored under high-temperature and high-humidity conditions for a long time.

(1) Soft Polymer

The soft polymer incorporated in the resin composition is a polymer usually having a glass transition temperature (Tg)

of not higher than 30° C. Note, in the case when a polymer has a plurality of Tg, the lowest Tg is not higher than 30° C.

As specific examples of the soft polymer, there can be mentioned olefin soft polymers such as liquid polyethylene, polypropylene, poly-1-butene, an ethylene-α-olefin copolymer, a propylene-α-olefin copolymer and an ethylene-propylene-diene copolymer (EPDM) and an ethylene-propylene-styrene copolymer: isobutylene soft polymers such as polyisobutylene, an isobutylene-isoprene rubber and an isobutylene-styrene copolymer; diene soft polymers such as polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene block copolymer, a styrene-butadiene-styrene block copolymer, an isoprene-styrene block copolymer and a styrene-isoprene-styrene block copolymer; silicon-containing soft polymers such as dimethylpolysiloxane, diphenylpolysiloxane and dihydroxypolysiloxane; soft polymers of α,β-unsaturated acid, such as polybutyl acrylate, polybutyl methacrylate, polyhydroxyethyl methacrylate, polyacrylamide, polyacrylonitrile and a butyl acrylate-styrene copolymer; soft polymers of unsaturated alcohol, amine or acyl derivatives thereof, or acetal, such as polyvinyl alcohol, polyvinyl acetate, polyvinyl stearate and a vinyl acetate-styrene copolymer; epoxy group-containing soft polymers such as polyethylene oxide, polypropylene oxide and eplchlohydrin rubber; fluorine-containing soft polymers such as vinylidene fluoride rubbers and a tetrafluoroethylene-propylene rubber; and other soft rubbers such as natural rubber, polypeptide, protein, a thermoplastic polyester elastomer, a thermoplastic vinyl chloride elastomer and a thermoplastic polyamide eastomer. These soft polymers may have a crosslinked structure or a functional group introduced therein by a modification reaction.

Among the above-recited soft polymers, diene soft polymers are preferable. Hydrogenated diene soft polymers made by hydrogenation of carbon-carbon unsaturated bonds of diene soft polymers are especially preferable in view of excellent rubber elasticity, mechanical strength, softness and dispersibility.

(2) Alcoholic Compound

The alcoholic compound used is a compound having at least one non-phenolic hydroxyl group in the molecule and preferably having at least one hydroxyl group and at least one ether bond or at least one ester bond in the molecule. Preferable alcoholic compounds include, for example, a divalent or more polyhydric alcohol, more preferably a trivalent or more polyhydric alcohol, and especially preferably an alcoholic ether compound or an alcoholic ester compound, which is prepared by etherifying or esterifying one hydroxyl group of a polyhydric alcohol having 3 to 8 hydroxyl groups.

As specific examples of the divalent or more polyhydric alcohol, there can be mentioned polyethylene glycol, glycerol, trimethylolpropane, pentaerythritol, diglycerol, triglycerol, dipentaerythritol, 1,6,7-trihydroxy-2,2-di(hydroxymethyl)-4-oxoheptane, sorbitol, 2-methyl-1,6,7-trihydroxy-2-hydroxymethyl-4-oxoheptane, 1,5,6-trihydroxy-3-oxohexane-pentaerythritol and tris(2-hydroxyethyl)isocyanurate. Trivalent or more polyhydric alcohols are preferable. Polyhydric alcohols having 3 to 8 hydroxyl groups are more preferable. When an alcoholic ester compound is prepared, trivalent or more polyhydric alcohols capable of forming an alcoholic ester compound containing α,β-diol, such as glycerol, diglycerol and triglycerol are preferable.

As specific examples of the alcoholic ester compound and alcoholic ether compound, there can be mentioned polyhydric alcoholic ester compounds such as glycerin monostearate, glycerin monolaurate, glycerin monobehenate, diglycerin monostearate, glycerin distearate, glycerin dilaurate, pentaerythritol monostearate, pentaerythritol monolaurate, pentaerythritol monobehenate, pentaerythritol distearate, pentaerythritol dilaurate, pentaerythritol tristearate and dipentaerythritol distearate; and alcoholic other compounds such as 3-(octyloxy)-1,2-propanediol, 3-(decyloxy)-1,2-propanediol, 3-(lauryloxy)-1, 2-propanediol, 3-(4-nonylphenyloxy)-1,2-propanediol, 1,6-dihydroxy-2,2-di(hydroxymethyl)-7-(4-nonylphenyloxy)-4-oxoheptane, an alcoholic ether compound prepared by reaction of a condensate of p-nonyl phenyl ether with formaldehyde, with glycldol, an alcoholic ether compound prepared by reaction of a condensate of p-octyl phenyl ether with formaldehyde, with glycidol, and an alcoholic ether compound prepared by reaction of a condensate of p-octyl phenyl ether with dicyclopentadiene, with glycidol, These alcoholic compounds may be used either alone or as a combination of at least two thereof.

The molecular weight of the alcoholic compound is not partcularly limited, but is usually in the range of 500 to 2,000 and preferably 800 to 1,500 in view of good transparency.

(3) Organic or Inorganic Filler

The organic filler Includes, for example, conventional organic polymer particles and crosslinked organic polymer particles. As specific examples of the organic polymer, there can be mentioned polyolefins such as polyethylene and polypropylene; halogen-containing vinyl polymers such as polyvinyl chloride and polyvinylidene chloride; polymers derived from α,β-unsaturated acid such as polyacrylate and polymethacrylate; polymers derived from an unsaturated alcohol such as polyvinyl acetate and polyvinyl alcohol; polyethylene oxide and a polymer derived from bisglycidyl ether; aromatic polycondensates such as polyphenylene oxide, polycarbonate and polysulfone; polyurethanes; polyamides; polyesters, phenol-aldehyde resins; natural high-molecular-weight compounds; and crosslinked products of these organic polymers.

As specific examples of the inorganic filler, there can be mentioned compounds of group 1 element of the periodic table such as lithium fluoride and borax (sodium borate hydrate salt); compounds of group 2 element such as magnesium carbonate, magnesium phosphate, calcium carbonate, strontium titanate and barium carbonate; compounds of group 4 element such as titanium dioxide (titania) and titanium monoxide; compounds of group 6 element such as molybdenum dioxide and molybdenum trioxide; compounds of group 7 element such as manganese chloride and manganese acetate; compounds of group 8 to group 10 element such as cobalt acetate; compounds of group 11 element such as cuprous iodide; compounds of group 12 element such as zinc oxide and zinc acetate; compounds of 13 group element such as aluminum oxide (alumina), aluminum fluoride and alumno-silicate (alumina silicate, kaolin and kaolinite); compounds of group 14 element such as graphite ore, carbon, graphite and glass; and natural ores such as carnallite, kainite, mica and phlogopite.

The amount of the above-mentioned three ingredients (1), (2) and (3) varies depending upon a combination of the particular alicyclic hydrocarbon copolymer and the particular ingredient filler. When the amount of these ingredients is too large, the resin composition has low glass transition temperature, reduced transparency and reduced heat resistance, and thus, is not suitable for optical use. In contrast, when the amount of these ingredients is too small, a shaped article of the resin composition is liable to become whitened and turbid when it is stored under high-temperature and high-humidity conditions. The amount of these ingredients is usually in the range of 0.01 to 10 parts by weight, preferably 0.02 to 5 parts by weight and more preferably 0.05 to 2 parts by weight, based on 100 parts by weight of the alicyclic hydrocarbon copolymer.

According to the need, the resin composition of the present invention may contain other ingredients such as an ultraviolet absorber, a light stabilizer, a near infrared ray absorber, a colorant such as dye and pigment, a lubricant, a plasticizer, an antistatic agent and an optical brightening agent. These ingredients may be used either alone or as a combination of at least two thereof. The amount thereof can be appropriately chosen provided that the object of the present invention is achieved.

The resin composition of the present invention is prepared by mixing together the above-mentioned copolymer and other ingredients. The mixing method is not particularly limited provided that the copolymer and other ingredients can be thoroughly mixed together. For example, a method of kneading the copolymer and other ingredients in a molten state by a mixer, a twin-screw kneader, a roll, a Brabender mixer or an extruder, and a method of dissolving and/or dispersing the copolymer and other ingredients in an appropriate solvent, followed by coagulation. When a twin-screw kneader is used, the kneaded resin composition in a molten state is usually extruded into a rod form and the rod is cut by a strand cutter into pellets of a desired size.

4. Shaped Article

The shaped article of the present invention can be obtained by shaping the above-mentioned alicyclic hydrocarbon polymer or the above-mentioned resin composition. The shaping procedure is not particularly limited, but, melt shaping is preferable because the shaped article is excellent in low birefringence, mechanical strength and dimensional precision. The melt shaping can be conducted by, for example, press-forming, extrusion shaping and injection molding. Injection molding is preferable in view of shaping performance and productivity.

The shaping conditions are appropriately chosen depending upon the use of shaped article and the shaping procedure. For example, the resin temperature at injection molding is usually in the range of 150° C. to 400° C., preferably 200° C. to 350° C. and more preferably 230° C. to 330° C. When the resin temperature at shaping is too low, the fluidity of resin composition is reduced and a shaped article is liable to have sink marks and distortion. In contrast, when the resin temperature is too high, the resin tends to be thermally degraded, and defects such as silver streaks and yellowing tend to occur in a shaped article.

The shaped article of the present invention is used in various forms which include, for example, sphere, rod, plate, column, cylinder, tube, fiber, film and sheet. As the shaped article is characterized as exhibiting very low birefringence, high transparency, high mechanical strength, high heat resistance and low water absorption, it can be used in many fields. Especially the shaped article is useful as optical parts.

As specific examples of the optical parts, there can be mentioned optical lenses and optical prisms which include, for example, camera lens, telescope lens, endoscope lens; total light transmitting lens such as eye-glass lens; pick-up lenses used for optical disks such as CD, CD-ROM, WORM (write optical disk), MO (write-enable optical disk, photo-magnetic disk), MD (mini-disk) and DVD (digital video disk); laser scanning lens such as sensor lens and fθ lens of laser beam printer; and prism lens of a camera finder.

As specific examples of optical disk used, there can be mentioned CD, CD-ROM, WORM (write optical disk), MO (write-enable optical disk, optical magnetic disk), MD (mini-disk) and DVD (digital video disk).

As specific examples of other optical parts, there can be mentioned light guide plate of a liquid display; optical films such as polarizing film, phase contrast film and light diffusing film; light diffusing plate; optical card; and substrate of liquid display element.

Further, the shaped article can be used in inspecting cells in medical appliances such as blood inspecting cell, injection syringe, pipes and tubes, medical vial and medical vessel; and insulation film of print circuit substrate.

The shaped article of the present invention is especially suitable for pick-up lenses and laser scanning lenses for which low birefringence is required. The shaped article is most suitable for pick-up lenses.

EXAMPLES

The invention will now be described by the following production examples, working examples and comparative examples which by no means limit the scope of the invention and wherein parts and % are by weight unless otherwise specified.

The properties of polymer and shaped article were evaluated by the following methods.

(1) Molecular Weight

Weight average molecular weight (Mw) was measured by GPC using tetrahydrofuran (THF) as a solvent and expressed in terms of standard polystyrene.

(2) Molecular Weight Distribution

Molecular weight was measured by GPC using tetrahydrofuran (THF) as a solvent, and weight average molecular weight (Mw) and number average molecular weight (Mn) as expressed in terms of standard polystyrene were determined. The molecular weight distribution was expressed by the ratio of Mw/Mn.

(3) Glass Transition Temperature (Tg)

Tg was measured according to JIS K7121.

(4) Hydrogen Addition Percentage

Hydrogen addition percentage to a copolymer was determined by $^1$H-NMR.

(5) Polymerization Conversion

Polymerization conversion was determined by gas chromatography.

(6) Mechanical Strength

Tensile strength was measured on a shaped sample according to JIS K7113. In the case where pick-up lenses and optical disks were molded, the mechanical strength was evaluated as to whether cracks occurred or not when a molding was released from a mold.

(7) Birefringence

Birefringence was measured by a polarizing microscope (546 nm Senarmont compensator, available from Nikon Co.)

(8) Oxidation-initiation Temperature

Oxidation initiation temperature was determined by thermogravimetry.

(9) High-temperature and High-humidity Test

A shaped article was placed and maintained at a constant temperature of 65° C. and a constant relative humidity of 90% for 1,000 hours in a thermostat. The shaped article was suddenly taken from the thermostat and placed in a normal environment. In the case of lens, several minutes later, variation of light transmittance in a wavelength region of 400 to 800 nm was measured to examine the white-turbidity. More specifically, in Example 7, light transmittance at a wavelength of 780 nm was measured. In the case of optical magnetic disk, the appearance of a metal recording film was observed.

Production Example 1

Production of Alicyclic Hydrocarbon Copolymer A

A stainless steel autoclave equipped with an electromagnetic stirrer was thoroughly dried and flushed with nitrogen, and then, 320 parts of dehydrated cyclohexane, 4 parts of a monomer mixture comprising styrene (St) and isoprene (IP) at a ratio of 95/5 by weight, and 0.1 part of dibutyl ether. Then, while the content was stirred at 50° C., 0.18 part of an n-butyllithium solution in hexane (n-butyllithium content: 15%) was added to the content to initiate polymerization. When polymerization was carried out for 30 minutes under the same conditions (at this time the conversion reached 96%), 76 parts of the same monomer mixture as mentioned above was added to the content in the autoclave over a period of one hour while the polymerization was continued under the same conditions. After completion of the monomer mixture (the conversion reached 95% at completion of addition), the polymerization was continued for 30 minutes under the same conditions. Then 0.1 part of isopropyl alcohol was added as a polymerization stopper to produce a styrene-isoprene copolymer (a).

A part of a polymerization liquid was poured in isopropyl alcohol to precipitate styrene-isoprene copolymer (a). The copolymer was taken and analyzed as follows. By a method described in Macromolecules 1983, No. 16, p1925–1928, unsaturated double bonds in the backbone chain of styrene-isoprene copolymer were ozonized and the copolymer was subjected to reductive cleavage, and then the weight average molecular weight and number average molecular weight of the chain of styrene monomer units were measured. Further, the following values were determined.

D=weight average molecular weight of the chain of repeating units derived from styrene monomer, E=weight average molecular weight (Mw) of copolymer× (number of repeating units derived from styrene monomer)/–(number of total repeating units constituting copolymer), F=number average molecular weight of the chain of repeating units derived from styrene monomer). Values of D/E×100 (%) and D/F were calculated.

To 400 parts of a solution of the above-mentioned copolymer (a) in cyclohexane, 8 parts of stabilized nickel hydrogenation catalyst (60% Nickel-supported silica-alumina carrier, available from JGC Corp.) was added. A stainless steel autoclave, equipped with an electrical heater for controlling the hydrogenation temperature, and an electromagnetic stirrer, was charged with the mixture of copolymer solution with catalyst. The inner atmosphere of autoclave wan replaced with hydrogen gas, and then, hydrogenation reaction was carried out at 160° C. for 6 hours with stirring while hydrogen gas was blown therein so that the pressure within the autoclave was maintained at 45 kg/cm². After completion of reaction, the hydrogenation catalyst was removed from the reaction liquid by filtration, and then 1,200 parts of cyclohexane was added. The mixture was poured into 10 liter of isopropanol to precipitate alicyclic hydrocarbon copolymer A. The alicyclic hydrocarbon copolymer A was separated by filtration and dried by a vacuum drier. The properties of copoymer A were evaluated. The results are shown in Table 1.

TABLE 1

|  | Example No. | | | | |
| --- | --- | --- | --- | --- | --- |
|  | Pro. Ex. 1 | Pro. Ex. 2 | Pro. Ex. 3 | C. Pro. Ex. 1 | C. Pro. Ex. 2 |
| Properties of copolymer before hydrogenation | | | | | |
| Mn | 178,000 | 172,000 | 140,000 | 176,000 | 187,000 |
| Mw | 190,000 | 188,000 | 150,000 | 190,000 | 200,000 |
| Mw/Mn | 1.07 | 1.09 | 1.07 | 1.08 | 1.07 |
| D/C × 100 (%) | 14 | 9 | 15 | 52 | 100 |
| D/F | 1.96 | 2.81 | 3.02 | 1.12 | — |
| Properties of copolymer after hydrogenation | | | | | |
| Hydragenation % | 99.9 | 99.5 | 100 | 99.9 | 99.4 |
| Mn | 110,000 | 107,000 | 81,000 | 110,000 | 104,000 |
| Mw | 132,000 | 131,000 | 95,000 | 132,000 | 135,000 |
| Mw/Mn | 1.20 | 1.22 | 1.18 | 1.20 | 1.22 |

Pro. Ex.: Production Example
C. Pro. Ex.: Comparative Production Example

Production Example 2

Production of Alicyclic Hydrocarbon Copolymer B

By the same procedures as described in Production Example 1, polymerization and hydrogenation were carried out wherein the amounts of styrene monomer (ST) and isoprene monomer (IP) were varied to 72 parts and 8 parts, respectively, and the composition of the monomer mixture was changed to St/IP=90/10 by weight. All other conditions remained the same. The properties of the thus obtained alicyclic hydrocarbon copolyner B were evaluated. The results are shown in Table 1.

Production Example 3

Production of Alicyclic Hydrocarbon Copolymer C

By the same procedures as described in Production Example 1, polymerization and hydrogenation were carried out wherein 0.13 part of dibutyl ether, 0.23 part of an n-butyllithium solution in hexane (n-butyllithium content: 15%), and 0.13 part of isopropyl alcohol as stopper were used with all other conditions remaining the same. The properties of the thus obtained alicyclic hydrocarbon copolymer C were evaluated. The results are shown in Table 1.

Comparative Production Example 1

Production of Hydrogenated Block Copolymer

By substantially the same procedures as described in Production Example 1, a hydrogenated block copolymer was produced wherein a styrene-isoprene-styrene triblock copolymer (isoprene content: 5% by weight) was prepared by the conventional anion polymerization procedure, and the triblock copolymer was hydrogenated. The properties of the thus obtained hydrogenated block copolymer were evaluated. The results are shown in Table 1.

Comparative Production Example 2

Production of Hydrogenated Styrene Homopolymer

By substantially the same procedures as described in Production Example 1, a hydrogenated styrene homopolymer was produced wherein a styrene homopolymer was prepared by the conventional anion polymerization procedure, and the homopolymer was hydrogenated. The properties of the thus obtained hydrogenated styrene homopolymer were evaluated. The results are shown in Table 1.

Examples 1 to 3

Production of Shaped Article

Each of alicyclic hydrocarbon copolymers A, B and C prepared in Production Examples 1 to 3 was kneaded and extruded into a pellet. The kneading was carried out by using a twin-screw kneader "TEM-35B" made by Toshiba Machine Co. (screw diameter: 37 mm, L/D: 32, screw revolutions: 250 rpm) at a resin temperature of 240° C. and a feed rate of 10 kg/hour.

Each pellet was press-formed at 200° C. by using a heat press forming machine (available from Tester Sangyo K.K.) to prepare a specimen. The properties of specimen were evaluated. The results are shown in Table 2.

Example 4

Production of Soft Polymer-added Composition and Shaped Article

By the same procedures as described in Examples 1 to 3, a copolymer specimen was prepared and its properties were evaluated wherein, to 100 parts of alicyclic hydrocarbon copolymer A prepared in Production Example 1, 0.2 part of soft polymer ("Tuftec H1052", supplied by Asahi Kasei Kogyo K.K., glass transition temperatures below 0° C.) and 0.1 part of antioxidant ("Irganox 1010" supplied by Chiba-Geigy AG) were added and the resultant resin composition was used as a shaping material. The evaluation results are shown in Table 2.

Example 5

Production of Alcoholic Ether Compound-added Composition and Shaped Article

By the same procedures as described in Examples 1 to 3, a copolymer specimen was prepared and its properties were evaluated wherein, to 100 parts of alicyclic hydrocarbon copolymer A prepared in Production Example 1, 0.3 part of poly(oxy-2-hydroxyltrimethylene)nonyl-phenyl-ether $HO[CH_2CH(OH)CH_2O]_nC_6H_4-C_9H_{19}$ (n is natural number and average value for total molecules was 2) (which was a partial ether compound prepared by reaction of 1 mol of nonylphenol with 2 mol of glycidol) and 0.1 part of antioxidant ("Irganox 1010" supplied by Chiba-Geigy AG) were added and the resultant resin composition was used as a shaping material. The evaluation results are shown in Table 2.

Example 6

Production of Alcoholic Ester Compound-added Composition and Shaped Article

By the same procedures as described in Examples 1 to 3, a copolymer specimen was prepared and its properties were evaluated wherein, to 100 parts of alicyclic hydrocarbon copolymer A prepared in Production Example 1, 0.2 part of behenic acid monoglyceride $[CH_3(CH_2)_{20}COOCH_2(CHOH)CH_2OH]$ (which was a partial ester compound prepared by reaction of 1 mol of behenic acid with 1 mol of glycerol) and 0.1 part of antioxidant ("Irganox 1010" supplied by Chiba-Geigy AG) were added and the resultant resin composition was used as a shaping material. The evaluation results are shown in Table 2.

Comparative Examples 1 and 2

Production of Shaped Article

By the same procedures as described in Examples 1 to 3, copolymer specimens were prepared and their properties were evaluated wherein polymers prepared in Comparative Examples 1 and 2 were used with all other conditions remaining the same. The evaluation results are shown in Table 2.

TABLE 2

| | Example No. | | | | | | | |
|---|---|---|---|---|---|---|---|---|
| | Ex. 1 | Ex. 2 | Ex. 3 | Ex. 4 | Ex. 5 | Ex. 6 | C. Ex. 1 | C. Ex. 2 |
| | | | | Polymer | | | | |
| | P. Ex. 1 | P. Ex. 2 | P. Ex. 3 | P. Ex. 1 | P. Ex. 1 | P. Ex. 1 | C. P. Ex. 1 | C. P. Ex. 2 |
| Tg (° C.) | 125 | 115 | 124 | 125 | 125 | 125 | 142–10 | 142 |
| Additive | not | not | not | (1) | (2) | (3) | not | not |
| Strength (kgf/cm$^2$) | 330 | 340 | 325 | 330 | 330 | 330 | 310 | 300 |

TABLE 2-continued

| | Example No. | | | | | | | |
|---|---|---|---|---|---|---|---|---|
| | Ex. 1 | Ex. 2 | Ex. 3 | Ex. 4 | Ex. 5 | Ex. 6 | C. Ex. 1 | C. Ex. 2 |
| | | | | Polymer | | | | |
| | P. Ex. 1 | P. Ex. 2 | P. Ex. 3 | P. Ex. 1 | P. Ex. 1 | P. Ex. 1 | C. P. Ex. 1 | C. P. Ex. 2 |
| Oxidation-initiating temp. (° C.) | 220 | 228 | 220 | 306 | 306 | 306 | 210 | 210 |
| Light transmittance (%) | 92 | 91 | 92 | 91 | 90 | 92 | 89 | 90 |
| Birefringence (nm) | 12 | 8 | 10 | 12 | 12 | 12 | 30 | 30 |

Additive
(1): soft polymer and antioxidant
(2): ether compound and antioxidant
(3): ester compoumd and antioxidant
Strength = Tensile strength As seen from Table 2, the alicyclic hydrocarbon copolymer of the present invention is characterized as follows.
(i) The birefringence is smaller than ½ of the birefringences of hydrogenated products of conventional block copolymer and polystyrene.
(ii) The oxidation-initiating temperature is 5 to 10° C. higher (namely, heat resistance is higher and thermal deterioration is smaller) than that of hydrogenation products of conventional polymers, and, when a minor amount of antioxidant is added (Examples 4–6), the oxidation-initiating temperature is enhanced by 80 to 90° C. and thus heat resistance is greatly improved.
(iii) The Mechanical strength and light transmittance are superior to those of hydrogenated products of conventional polymers.

Examples 7 and 12

Manufacture of Optical Lens

Three kinds of pellets prepared in Examples 1 to 6 were shaped into six kinds of non-spherical surface pick-up lenses for CD player (effective diameter: 4.5 mm, thickness 3.4 mm. focus distance: 4.5 mm) by using an injection molding machine "AUTOSHOTC Model 30A" made by Fanuc Ltd. (clamp pressure: 30%, resin temperatures 260° C., mold temperatures 100° C., injection pressure: 900 kg/cm$^2$). The properties of the pick-up lenses were evaluated. The results are shown in Table 3.

Comparative Examples 3 and 4

Manufacture of Optical Lens

Three kinds of pick-up lenses were manufactured by the same procedures as described in Examples 7 to 12 wherein three kinds of pellets prepared in Comparative Examples 1 and 2 were used with all other conditions remaining the same. The properties of the pick-up lenses were evaluated. The results are shown in Table 3.

TABLE 3

| | Polymer | | | | | | | |
|---|---|---|---|---|---|---|---|---|
| | P. Ex. 1 | P. Ex. 2 | P. Ex. 3 | P. Ex. 1 | P. Ex. 1 | P. Ex. 1 | C. P. Ex. 1 | C. P. Ex. 2 |
| Additive | not | not | not | (1) | (2) | (3) | not | not |
| Birefringence (nm) | 17 | 10 | 17 | 17 | 17 | 17 | 50 | 50 |
| Mechanical strength | Good | Good | Good | Good | Good | Good | Poor | Poor |
| Light transmittance B (%) | 94 | 93 | 94 | 93 | 92 | 93 | 90 | 92 |
| Light transmittance A (%) | 50 | 48 | 50 | 92 | 91 | 92 | 40 | 45 |

Additive
(1): soft polymer and antioxidant
(2): ether compound and antioxidant
(3): ester compound and antioxidant
Mechanical strength
Good: No failure observed at release from mold
Poor: Cracks ocurred at release from mold
Light transmittance B: light transmittance as measured before test
Light transmittance A: light transmittance as measured after test In prior art, when pick-up lens for CD having a complex shape is molded, the birefringence is liable to be large. But, the copolymer of the present invention exhibits a low birefringence. When the copolymer of the present invention is placed under high-temperature and high-humidity conditions for a long period of time, the copolymer exhibits good durability (reduced water absorption and weather resistance) which is approximately the same as or superior to those of conventional polymers. When a humidity resistance-enhancing additive is incorporated (Examples 4–6), the light transmittance as measured before the test and that as measured after the test are approximately the same.

Comparative Examples 5 and 6

Manufacture of Optical Disk

Three kinds of optical disk substrates and three kinds of optical disks were manufactured by the same procedures as described in Examples 13 to 18 wherein three kinds of pellets prepared in Comparative Examples 1 and 2 were used with all other conditions remaining the same. The properties of the optical disk substrates were evaluated. The results are shown in Table 4.

TABLE 4

|  | Example No. | | | | | | | |
| --- | --- | --- | --- | --- | --- | --- | --- | --- |
|  | Ex. 13 | Ex. 14 | Ex. 15 | Ex. 16 | Ex. 17 | Ex. 18 | C. Ex. 5 | C. Ex. 6 |
|  | | | | Polymer | | | | |
|  | P. Ex. 1 | P. Ex. 2 | P. Ex. 3 | P. Ex. 1 | P. Ex. 1 | P. Ex. 1 | C. P. Ex. 1 | C. P. Ex. 2 |
| Additive | not | not | not | (1) | (2) | (3) | not | not |
| Birefringent (nm) | 1 | 0 | 1 | 1 | 1 | 0 | 12 | 10 |
| Mechanical strength | Good | Good | Good | Good | Good | Good | Poor | Poor |
| Light transmittance B (%) | 95 | 94 | 95 | 94 | 94 | 94 | 91 | 93 |
| Light transmittance A (%) | 60 | 57 | 60 | 94 | 93 | 94 | 53 | 55 |
| Appearance of Recording film | A | A | A | A | A' | A' | B | B |

Additive
(1): soft polymer and antioxidant
(2): ether compound and antioxidant
(3): ester compound and antioxidant
Mechanical strength
Good: No failure observed at release from mold
Poor: Cracks occurred at release from mold
Appearance of recording film
A: Diameter 9 μm blister
A': No change observed
B: Diameter 10 μm blister Examples 13 to 18

Manufacture of Optical Disk

Seven kinds of pellets prepared in Examples 1 to 6 were injection molded into six kinds of optical disk substrates having a diameter of 130 mm by using an infection molding machine "DISKIII" made by Sumitomo Heavy Ind. Ltd. and a mold equipped with a stamper for optical disk (resin temperatures 340° C., mold temperature: 120° C.). The properties of the pick-up lenses were evaluated. The results are shown in Table 4.

Forming of Recording Film Layer

A recording film layer was formed by using "ILC-3000" made by Nichiden Anelva Co. The recording film layer was comprised of SiN 100 nm, TbFeCo 30 nm, SiN 40 nm and Al 40 nm. In the recording film layer, the recording material layer was not formed on the outermost pheripheral with 1 mm width and on the inner peripheral (outside the groove) with 2 mm width.

The thus-made optical disks were maintained at 65° C. and a relative humidity of 90% for 1,000 hours to carry out an accelerated durability test. The appearance of the surface of each disk was observed by an optical microscope. The results are shown in Table 4.

As seen from Table 4, an optical disk made of the copolymer of the present invention exhibits low birefringence. When a partial ether compound or partial ester compound is incorporated (Examples 4–6), the polymer composition exhibits good durability for accelerated high-temperature and high-humidity exposing test, namely, the surface of recording film is changed only to a minimized extent. Thus, the recording film exhibits good adhesion.

Industrial Applicability

The present invention provides a novel copolymer exhibiting low birefringence and high mechanical strength, a process for producing the copolymer, and a resin composition comprising the copolymer. The copolymer and the resin composition give shaped articles exhibiting low birefringence and high mechanical strength, which are especially suitable for optical parts such as pick-up lenses.

What is claimed is:

1. An alicyclic hydrocarbon copolymer having a weight average molecular weight in the range of 1,000 to 1,000,000 and comprising repeating units (a) represented by the following general formula (1), and at least one kind of repeating units (b) selected from those which are represented by the following general formula (2) and/or the following general formula (3); the sum of repeating units (a) and repeating units (b) being at least 90% by weight based on the weight of the copolymer, and the content of repeating units (b) being at least 1% by weight but smaller than 10% by weight, based on the weight of the copolymer; and the chain of repeating units (a) satisfying the following formula:

$$A \leq 0.3 \times B$$

where A=weight average molecular weight of the chain of repeating units (a), and B=weight average molecular weight (Mw) of the alicyclic hydrocarbon copolymer×(number of repeating units (a)/number of the total repeating units constituting the alicyclic hydrocarbon copolymer),

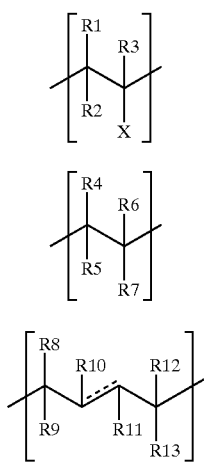

Formula (1)

Formula (2)

Formula (3)

wherein X in formula (1) is an alicyclic hydrocarbon group, R1 through R13 in formulae (1), (2) and (3) independently represent a hydrogen atom, a chainlike hydrocarbon group, a halogen atom, an alkoxy group, a hydroxy group, an ether group, an ester group, a cyano group, an amide group, an imide group, a silyl group, and a chainlike hydrocarbon group having one or more polar groups as a substituent which are selected from a halogen atom, an alkoxy group, a hydroxy group, an ether group, an ester group, a cyano group, an amide group, an imide group and a silyl group; and ==== in formula (3) represents a carbon-carbon saturated or unsaturated bond.

2. The alicyclic hydrocarbon copolymer according to claim 1 wherein the alicyclic group X in formula (1) representing repeating units (a) is a cyclohexyl group.

3. The alicyclic hydrocarbon copolymer according to claim 1 wherein the chain of repeating units (a) represented by formula (1) satisfies the following formula:

$$A/C \geq 1.3$$

where A=weight average molecular weight of the chain of repeating units (a), and C=number average molecular weight of the chain of repeating units (a).

4. The alicyclic hydrocarbon copolymer according to claim 1 wherein the ratio (Mw/Mn) of the weight average molecular weight (Mw) of the copolymer to the number average molecular weight (Mn) of the copolymer is not larger than 2.5.

5. The alicyclic hydrocarbon copolymer according to claim 1 which has a glass transition temperature (Tg) of 50° C. to 250° C.

6. A process for producing an alicyclic hydrocarbon copolymer comprising:

a step of copolymerizing an aromatic vinyl compound and/or an alicyclic vinyl compound with other copolymerizable monomer to obtain a hydrocarbon copolymer satisfying the following formula:

$$D \leq 0.3 \times E$$

where D=weight average molecular weight of the chain of repeating units derived from the aromatic vinyl compound and/or the alicyclic vinyl compound, and E=weight average molecular weight (Mw) of the alicyclic hydrocarbon copolymer×(number of repeating units derived from the aromatic vinyl compound and/or the alicyclic vinyl compound/number of the total repeating units constituting the alicyclic hydrocarbon copolymer); and a step of hydrogenating carbon-carbon unsaturated bonds in the unsaturated rings and the backbone chain of the alicyclic hydrocarbon copolymer.

7. A process for producing an alicyclic hydrocarbon copolymer comprising:

a step of copolymerizing an aromatic vinyl compound and/or an alicyclic vinyl compound with other copolymerizable monomer while the aromatic vinyl compound and/or the alicyclic vinyl compound, and the copolymerizable monomer are sequentially added to a polymerization system, and a step of hydrogenating carbon-carbon unsaturated bonds in the unsaturated rings and the backbone chain of the alicyclic hydrocarbon copolymer wherein the alicyclic hydrocarbon copolymer comprises repeating units (a) represented by the following general formula (1), and at least one kind of repeating units (b) selected from those which are represented by the following general formula (2) and/or the following general formula (3); the sum of repeating units (a) and repeating units (b) being at least 90% by weight based on the weight of the copolymer, and the content of repeating unit (b) being at least 1% by weight but smaller than 10% by weight, based on the weight of the copolymer;

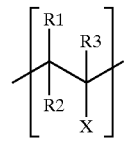

Formula (1)

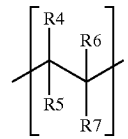

Formula (2)

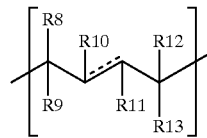

Formula (3)

wherein X in formula (1) is an alicyclic hydrocarbon group R1 through R13 in formulae (1), (2) and (3) independently represent a hydrogen atom, a chainlike hydrocarbon group, a halogen atom, an alkoxy group, a hydroxy group, an ether group, an ester group, a cyano group, an amide group, an imide group, a silyl group, and a chainlike hydrocarbon group having one or more polar groups as a substituent which are selected from a halogen atom, an alkoxy group, a hydroxy group, an ether group, an ester group, a cyano group, an amide group, an imide group and a silyl group; and ≡ in formula (3) represents a carbon-carbon saturated or unsaturated bond.

8. The process for producing an alicyclic hydrocarbon copolymer according to claim 6, wherein said other polymerizable monomer is a conjugated diene.

9. A resin composition comprising an alicyclic hydrocarbon copolymer as claimed in claim 1, and an antioxidant.

10. The resin composition according to claim 9, which further comprises at least one ingredient selected from the group consisting of soft polymers, alcoholic compounds, and organic or inorganic fillers.

11. A shaped article made of an alicyclic hydrocarbon copolymer as claimed in claim 1.

12. The shaped article according to claim 11, which is an optical part.

13. The shaped article according to claim 11, which is an optical lens.

14. A shaped article made of a resin composition as claimed in claim 9.

15. The shaped article according to claim 14, which is an optical part.

16. The shaped article according to claim 14, which is an optical lens.

* * * * *